United States Patent
Deng et al.

(10) Patent No.: US 11,158,119 B2
(45) Date of Patent: Oct. 26, 2021

(54) SYSTEMS AND METHODS FOR RECONSTRUCTING A THREE-DIMENSIONAL OBJECT

(71) Applicant: QUALCOMM Incorporated, San Diego, CA (US)

(72) Inventors: Yan Deng, La Jolla, CA (US); Michel Adib Sarkis, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/738,982

(22) Filed: Jan. 9, 2020

(65) Prior Publication Data

US 2021/0217228 A1 Jul. 15, 2021

(51) Int. Cl.
*G06T 17/00* (2006.01)
*G06T 3/00* (2006.01)

(52) U.S. Cl.
CPC ............ *G06T 17/00* (2013.01); *G06T 3/0068* (2013.01)

(58) Field of Classification Search
None
See application file for complete search history.

(56) References Cited

U.S. PATENT DOCUMENTS

| | | | |
|---|---|---|---|
| 10,157,477 B2 | 12/2018 | Chen | |
| 2012/0062749 A1* | 3/2012 | Kawahata | G06K 9/00362 348/152 |
| 2015/0123967 A1 | 5/2015 | Quinn et al. | |

OTHER PUBLICATIONS

Schumacher, Matthaeus, and Volker Blanz. "Exploration of the correlations of attributes and features in faces." 2015 11th IEEE International Conference and Workshops on Automatic Face and Gesture Recognition (FG). vol. 1. IEEE, 2015.*
Weise, Thibaut, et al. "Realtime performance-based facial animation." ACM transactions on graphics (TOG) 30.4 (2011): 1-10.*
Zeng H, Yang B, Wang X, Liu J, Fu D. RGB-D Object Recognition Using Multi-Modal Deep Neural Network and DS Evidence Theory. Sensors. Jan. 2019;19(3):529.*
Newcombe R.A., et al., "DynamicFusion: Reconstruction and Tracking of Non-rigid Scenes in Real-Time," IEEE Conference on Computer Vision and Pattern Recognition (CVPR), 2015, 10 Pages.
Yu T., et al., "DoubleFusion: Real-time Capture of Human Performances with Inner Body Shapes from a Single Depth Sensor", IEEE Conference on Computer Vision and Pattern Recognition (CVPR), Apr. 17, 2018, Retrieved from the Internet: arXiv:1804.06023v1 [cs.CV], 10 pages.

(Continued)

*Primary Examiner* — Zhengxi Liu
(74) *Attorney, Agent, or Firm* — Polsinelli LLP

(57) ABSTRACT

A method performed by an electronic device is described. The method includes receiving first optical data and first depth data corresponding to a first frame. The method also includes registering the first depth data to a first canonical model. The method further includes fitting a three-dimensional (3D) morphable model to the first optical data. The method additionally includes registering the 3D morphable model to a second canonical model. The method also includes producing a 3D object reconstruction based on the registered first depth data and the registered 3D morphable model.

30 Claims, 9 Drawing Sheets

(56) References Cited

OTHER PUBLICATIONS

Fitzpatrick J.M., et al., "Chapter 8 Image Registration" In: "Medical Image Processing, vol. 2 of the Handbook of Medical Imaging", Jul. 1, 2000 (Jul. 1, 2000), SPIE Press, XP055089072, pp. 449-514.
International Search Report and Written Opinion—PCT/US2020/064857—ISA/EPO—dated Mar. 29, 2021.

* cited by examiner

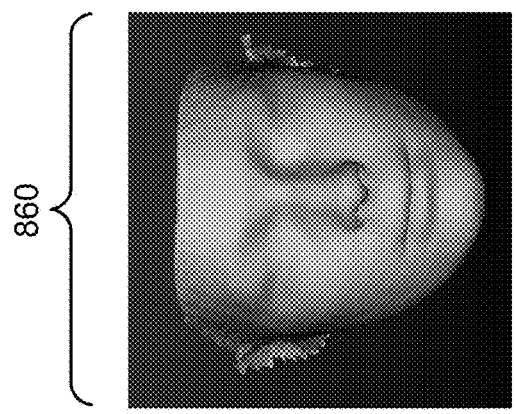
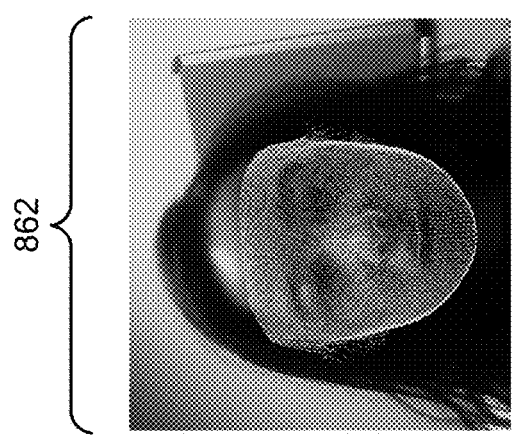
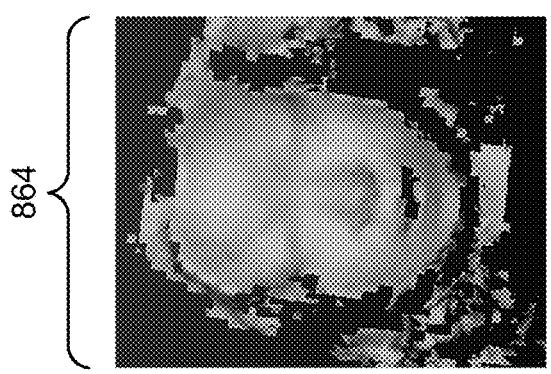
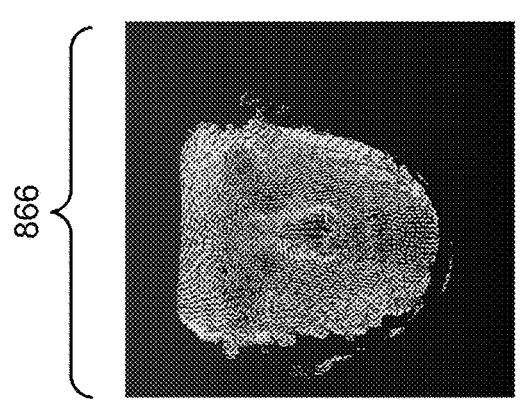
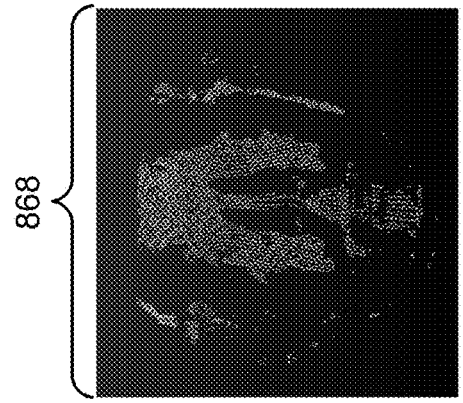
FIG. 8

SYSTEMS AND METHODS FOR RECONSTRUCTING A THREE-DIMENSIONAL OBJECT

FIELD OF DISCLOSURE

The present disclosure relates generally to electronic devices. More specifically, the present disclosure relates to systems and methods for reconstructing a three-dimensional (3D) object.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices, action cameras, surveillance cameras, mounted cameras, connected cameras, robots, drones, healthcare equipment, set-top boxes, etc.) capture and/or utilize sensor data. For example, a smart phone may capture and/or process still and/or video images. Processing sensor data may demand a relatively large amount of time, memory, and energy resources. The resources demanded may vary in accordance with the complexity of the processing.

In some cases, sensor data may be noisy and/or may exhibit inaccuracies. For example, some sensor data may suffer from low signal-to-noise ratio (SNR) and/or drift. As can be observed from this discussion, systems and methods that improve sensor data processing may be beneficial.

SUMMARY

A method performed by an electronic device is described. The method includes receiving first optical data and first depth data corresponding to a first frame. The method also includes registering the first depth data to a first canonical model. The method further includes fitting a three-dimensional (3D) morphable model to the first optical data. The method additionally includes registering the 3D morphable model to a second canonical model. The method also includes producing a 3D object reconstruction based on the registered first depth data and the registered 3D morphable model.

Registering the first depth data may include performing at least one of a rigid registration and a non-rigid registration of the first depth data. Registering the 3D morphable model may include performing at least one of a rigid registration and a non-rigid registration of the 3D morphable model.

The method may include receiving second depth data corresponding to a second frame that is previous to the first frame. The method may also include mapping the second depth data to a canonical coordinate system to update the first canonical model.

The method may include receiving second optical data corresponding to a second frame that is previous to the first frame. The method may also include fitting a second 3D morphable model to the second optical data. The method may further include mapping the second 3D morphable model to a canonical coordinate system to produce the second canonical model.

The method may include determining first normals of respective samples of the first depth data. The method may also include determining second normals of respective samples of the 3D morphable model. The method may further include determining whether to select each of the samples of the 3D morphable model based on a corresponding first normal and a corresponding second normal.

Determining whether to select each of the samples of the 3D morphable model may include determining an inner product of the corresponding first normal and the corresponding second normal. Determining whether to select each of the samples of the 3D morphable model may also include comparing the inner product to a threshold.

Determining whether to select each of the samples of the 3D morphable model may include selecting a sample of the 3D morphable model in response to determining that the inner product is greater than the threshold. Determining whether to select each of the samples of the 3D morphable model may include rejecting the sample in response to determining that the inner product is not greater than the threshold.

Producing the 3D object reconstruction may be based on selected samples of the 3D morphable model. The 3D object reconstruction may be a 3D facial model.

An electronic device is also described. The electronic device includes a memory. The electronic device also includes a processor coupled to the memory. The processor is configured to receive first optical data and first depth data corresponding to a first frame. The processor is also configured to register the first depth data to a first canonical model. The processor is further configured to fit a three-dimensional (3D) morphable model to the first optical data. The processor is additionally configured to register the 3D morphable model to a second canonical model. The processor is also configured to produce a 3D object reconstruction based on the registered first depth data and the registered 3D morphable model.

A non-transitory tangible computer-readable medium storing computer executable code is also described. The computer-readable medium includes code for causing an electronic device to receive first optical data and first depth data corresponding to a first frame. The computer-readable medium also includes code for causing the electronic device to register the first depth data to a first canonical model. The computer-readable medium further includes code for causing the electronic device to fit a three-dimensional (3D) morphable model to the first optical data. The computer-readable medium additionally includes code for causing the electronic device to register the 3D morphable model to a second canonical model. The computer-readable medium also includes code for causing the electronic device to produce a 3D object reconstruction based on the registered first depth data and the registered 3D morphable model.

An apparatus is also described. The apparatus includes means for receiving first optical data and first depth data corresponding to a first frame. The apparatus also includes means for registering the first depth data to a first canonical model. The apparatus further includes means for fitting a three-dimensional (3D) morphable model to the first optical data. The apparatus additionally includes means for registering the 3D morphable model to a second canonical model. The apparatus also includes means for producing a 3D object reconstruction based on the registered first depth data and the registered 3D morphable model.

BRIEF DESCRIPTION OF THE DRAWINGS

FIG. 8 is a diagram illustrating an example of sample selection determination in accordance with some examples of the systems and methods described herein.

DETAILED DESCRIPTION

Figure 1:
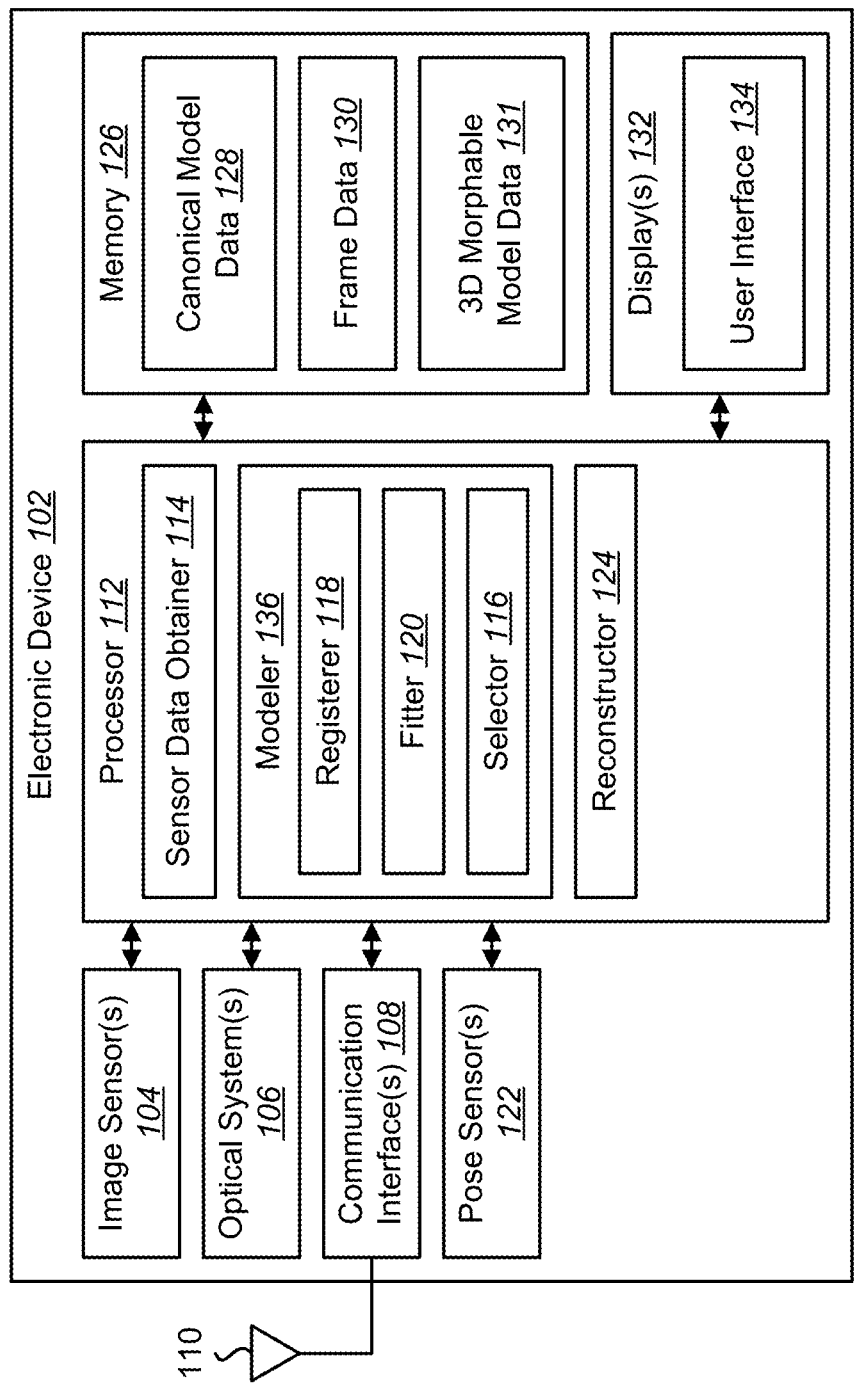
FIG. 1 is a block diagram illustrating one example of an electronic device in which systems and methods for reconstructing a 3D object may be implemented.

Some configurations of the systems and methods disclosed herein may be implemented in order to produce a three-dimensional (3D) model of an object (e.g., one or more objects). For example, some configurations of the systems and methods disclosed herein relate to non-rigid facial reconstruction with a 3D morphable model. As used herein, the term "rigid" and variations thereof may refer to inflexible object features. As used herein, the terms "deformation" and/or "transformation" may refer to a change in position and/or shape of an object. For example, a rigid deformation, transformation, and/or reconstruction of an object may be performed with a condition that each point of an object is inflexibly related to all other points of the object. For instance, a rigid deformation or transformation may allow for translation (e.g., shifting) and/or rotation of an object while preserving lengths and/or angles between points of the object. As used herein, the term "non-rigid" and variations thereof may refer to flexible object features. For example, a non-rigid deformation, transformation, and/or reconstruction of an object may allow for one or more points of an object to be flexibly related to one or more other points of the object. For instance, a non-rigid deformation or transformation may allow for changes in one or more lengths and/or angles between points of the object.

Object reconstruction may include producing a 3D model of the object. Some approaches to object reconstruction may fail in some cases. For instance, some approaches may fail to reconstruct a face of a person when the person is moving quickly and/or when other parts of the person besides the face are included in a depth image. For example, some approaches to rigid 3D reconstruction may register incoming frames with a reference frame within a region of interest (ROI), fuse all the frames together to the coordinates of the reference frame, and construct a 3D mesh. One problem with these approaches is that a correspondence may be lost due to fast movement. For example, if a person's face is moving quickly, the face may be positioned very differently between frames (i.e., two consecutive frames). In other words, when movement between two consecutive frames is large, the correspondence generated from the depth information may not be enough to recover an accurate deformation. Accordingly, registration between the frames may fail due to the lost correspondence. More specifically, some approaches only use rigid deformation, and may require a correctly extracted ROI of a facial region. However, consistently extracting a correct ROI can be difficult to achieve in practice due to fast motion, occlusions, and/or noisy depth data. For example, ROI extraction may rely on detected and/or tracked facial features. Fast motion, occlusions, and/or noisy depth data may cause errors in detecting and/or tracking facial features, which may cause a false ROI to be extracted. A false ROI may lead to an erroneous registration due to an incorrect location and/or size of the false ROI.

In order to overcome some of the aforementioned problems, some configurations of the systems and methods disclosed herein may perform non-rigid 3D object reconstruction with a 3D morphable model. For instance, one or more 3D morphable models based on one or more frames may be utilized. Some examples of 3D morphable models may be a defined face model with a fixed number of vertices, number of triangles, and/or edges between vertices. A correspondence between models (e.g., correspondence between a 3D morphable model and a canonical model) may be utilized as prior knowledge to improve 3D object reconstruction. Additionally or alternatively, a non-rigid deformation may be utilized. For instance, a global rigid deformation and a hybrid local non-rigid deformation may be utilized. A global rigid deformation may be a rigid deformation applied to an entire object (e.g., points of an object) and/or frame of data. A hybrid local non-rigid deformation may include a non-rigid deformation that is applied to a portion of an object (e.g., subset of points of the object) and/or frame of data. Some configurations of the systems and methods disclosed herein can successfully reconstruct a 3D model of a face of a person, even when the person is moving quickly.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for reconstructing a 3D object may be implemented. Examples of the electronic device 102 include cameras, video camcorders, digital cameras, cellular phones, smartphones, tablet devices, personal cameras, wearable cameras, virtual reality devices (e.g., headsets), augmented reality devices (e.g., headsets), mixed reality devices, action cameras, surveillance cameras, mounted cameras, connected cameras, vehicles (e.g., semi-autonomous vehicles, autonomous vehicles, etc.), automobiles, robots, aircraft, drones, unmanned aerial vehicles (UAVs), servers, computers (e.g., desktop computers, laptop computers, etc.), network devices, healthcare equipment, gaming consoles, appliances, etc. In some configurations, the electronic device 102 may be integrated into one or more devices (e.g., vehicles, drones, mobile devices, etc.). The electronic device 102 may include one or more components or elements. One or more of the components or elements may be implemented in hardware (e.g., circuitry) or a combination of hardware and instructions (e.g., a processor with software stored in memory).

In some configurations, the electronic device 102 may include a processor 112, a memory 126, one or more displays 132, one or more image sensors 104, one or more optical systems 106, one or more communication interfaces 108, and/or one or more pose sensors 122. The processor 112 may be coupled to (e.g., in electronic communication with) the memory 126, display(s) 132, image sensor(s) 104, optical system(s) 106, communication interface(s) 108, and/or pose sensor(s) 122. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

The memory 126 may store instructions and/or data. The processor 112 may access (e.g., read from and/or write to) the memory 126. Examples of instructions and/or data that may be stored by the memory 126 may include canonical model data 128, frame data 130 (e.g., image data, pixel values, red-green-blue (RGB) values, radiance values, depth image data, frame position data, and/or frame orientation data, etc.), 3D morphable model data 131, sensor data obtainer 114 instructions, modeler 136 instructions, registerer 118 instructions, fitter 120 instructions, selector 116 instructions, reconstructor 124 instructions, and/or instructions for other elements, etc.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. For example, the communication interface 108 may enable one or more kinds of wireless (e.g., cellular, wireless local area network (WLAN), personal area network (PAN), etc.) communication. Additionally or alternatively, the communication interface 108 may enable one or more kinds of cable and/or wireline (e.g., Universal Serial Bus (USB), Ethernet, High Definition Multimedia Interface (HDMI), fiber optic cable, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface(s) 108 may send information (e.g., canonical model information, 3D morphable model information, pose information, image information, location information, etc.) to and/or receive information from another electronic device (e.g., a vehicle, a smart phone, a camera, a display, a robot, a remote server, etc.).

In some configurations, the electronic device 102 (e.g., sensor data obtainer 114) may obtain and/or receive one or more frames. Examples of frames include image frames, video, depth image frames, and/or red-green-blue-depth (RGBD) frames, etc. The one or more frames may indicate and/or depict an environment, such as one or more objects and/or background.

In some configurations, the electronic device 102 may include one or more image sensors 104. Examples of image sensor(s) 104 may include optical image sensors, depth image sensors, red-green-blue-depth (RGBD) sensors, etc. For example, the electronic device 102 may include one or more depth sensors (e.g., time-of-flight cameras, structured light cameras, lidar sensors, etc.) and/or optical sensors (e.g., two-dimensional (2D) image sensors, 3D image sensors, etc.).

The image sensor(s) 104 may capture one or more frames. Examples of frames include optical image frames, depth image frames, optical/depth frames, RGBD frames, etc. As used herein, the term "optical" may denote visual spectrum information. For example, an optical image sensor may sense visual spectrum data. As used herein, the term "depth" may denote a distance between a depth sensor and an object. For example, a depth sensor may sense depth data (e.g., one or more distances between the depth sensor and an object). It should be noted that the frame data 130 may include one or more types of data (e.g., optical data, depth data, time-of-flight data, position data, and/or orientation data, etc.) associated with one or more times or time ranges. For example, a "frame" may correspond to an instant of time or a range of time in which data corresponding to the frame is captured. Different frames may be separate or overlapping in time. Frames may be captured at regular periods, semi-regular periods, or aperiodically.

In some configurations, the image sensor(s) 104 may utilize one or more optical systems 106. An optical system 106 may focus images of objects that are located within the field of view of the optical system 106 onto an image sensor 104. Examples of the optical system(s) 106 include lenses. For example, the electronic device 102 may include two or more lenses in some configurations. The lenses may have the same focal length or different focal lengths. In some configurations, different lenses may each be paired with separate image sensors 104. Additionally or alternatively, two or more lenses may share the same image sensor 104. The optical system(s) 106 may be coupled to and/or controlled by the processor 112 in some configurations.

In some implementations, the electronic device 102 may include a single image sensor 104 and a single optical system 106. For example, a single camera may capture frames at a resolution (e.g., 1280×800 pixels, etc.) and at a particular frame rate (e.g., 30 frames per second (fps), 60 fps, 120 fps, etc.). In other implementations, the electronic device 102 may include multiple optical systems 106 and/or multiple image sensors 104 that may capture images at different resolutions and/or different frame rates.

In some examples, the image sensor(s) 104 and/or the optical system(s) 106 may be included in (or mechanically coupled to) the electronic device 102 or another electronic device. For instance, the image sensor(s) 104 and/or the optical system(s) 106 may be included in a smart phone or a remote camera. In some configurations, the image sensor(s) 104 may be linked to the electronic device 102 via a wired and/or wireless link. In some configurations, a camera may include at least one sensor and at least one optical system. Accordingly, the electronic device 102 may be one or more cameras, may include one or more cameras, and/or may be coupled to one or more cameras in some implementations.

In some configurations, the electronic device 102 may request and/or receive the one or more frames from another device. For example, the electronic device 102 may receive one or more frames from one or more external sensors linked to the electronic device 102. In some configurations, the electronic device 102 may request and/or receive the one or more frames via the communication interface 108. For example, the electronic device 102 may or may not include an image sensor 104 and/or pose sensor 122 and may receive frames (e.g., optical image frames, depth image frames, position data, and/or orientation data, etc.) from one or more remote devices.

In some configurations, the electronic device 102 may include one or more pose sensors 122. Examples of pose sensor(s) 122 may include one or more accelerometers, tilt sensors, gyros, Global Positioning System (GPS) receivers, motion sensors, inertial measurement units (IMUs), image sensors, etc. The pose sensor(s) 122 may be utilized to detect one or more poses of the electronic device 102 and/or of the image sensor(s) 104. In some configurations, a pose may include position and/or orientation of the electronic device 102 and/or image sensor(s) 104. For example, a pose may include rotations in one or more dimensions and/or translations in one or more dimensions. In some implementations, one or more image sensor(s) 104 may be utilized as pose sensor(s) 122 and/or an image-based (e.g., RGB-based, RGBD-based, etc.) algorithm may be utilized to estimate pose. Additionally or alternatively, the image sensor(s) 104 and pose sensor(s) 122 may be mounted on the same rigid frame (e.g., rigid mounting frame, rigid vehicle frame, etc.).

In some configurations, the pose sensor(s) 122 may include one or more accelerometers and/or one or more gyroscopes for detecting pose. For example, the accelerometer(s) may detect acceleration in one or more directions (e.g., along one or more axes), which may be utilized to determine translation in one or more dimensions. The gyroscope(s) may detect orientation. For example, the gyroscope(s) may determine roll, pitch, and/or yaw values. In some implementations, the pose sensor(s) 122 may provide three-dimensional (3D) accelerometer information and 3D gyroscope information that indicate pose. The pose(s) may be relative to a coordinate system. For example, the pose(s) may be expressed as translational values in three dimensions (e.g., x, y, and z) and rotational values in three dimensions (e.g., yaw, pitch, and roll). In some configurations, position data and/or orientation data from a pose sensor 122 may be utilized to help detect global rigid motion of the electronic device 102 and/or image sensor(s) 104.

In some configurations, the electronic device 102 may include one or more displays 132. A display 132 may be a screen or panel for presenting images. In some examples, the display(s) 132 may be implemented with one or more display technologies, such as liquid crystal display (LCD), organic light-emitting diode (OLED), plasma, cathode ray tube (CRT), etc. The display(s) 132 may present content. Examples of content may include one or more frames, video, still images, graphics, virtual environments, three-dimensional (3D) image content, 3D models, symbols, characters, etc. In some configurations, the content described herein (e.g., frames, 3D models, etc.) may be presented on the display(s) 132. For example, the display(s) 132 may present an image depicting a 3D model of an object. In some configurations, all or portions of the frames that are being captured by the image sensor(s) 104 may be presented on the display 132. Additionally or alternatively, one or more representative images (e.g., icons, cursors, virtual reality images, augmented reality images, etc.) may be presented on the display 132.

The display(s) 132 may be integrated into the electronic device 102 or may be linked to the electronic device 102. In some examples, the display(s) 132 may be a monitor with a desktop computer, a display on a laptop, a touch screen on a tablet device, an OLED panel in a smartphone, etc. In another example, the electronic device 102 may be a virtual reality headset with integrated displays 132. In another example, the electronic device 102 may be a computer that is coupled to a virtual reality headset with the displays 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera and may detect user gestures (e.g., hand gestures, arm gestures, eye tracking, eyelid blink, etc.). In another example, the electronic device 102 may be linked to a mouse and may detect a mouse click. In yet another example, the electronic device 102 may be linked to one or more other controllers (e.g., game controllers, joy sticks, touch pads, motion sensors, etc.) and may detect input from the one or more controllers.

The processor 112 may include and/or implement a sensor data obtainer 114, a modeler 136, a registerer 118, a fitter 120, a selector 116, and/or a reconstructor 124. It should be noted that one or more of the elements illustrated in the electronic device 102 and/or processor 112 may be optional. For example, the processor 112 may not include and/or implement the selector 116 and/or the reconstructor 124 in some configurations. Additionally or alternatively, one or more of the elements illustrated in the processor 112 may be implemented separately from the processor 112 (e.g., in other circuitry, on another processor, on a separate electronic device, etc.).

The processor 112 may include and/or implement a sensor data obtainer 114. The sensor data obtainer 114 may obtain sensor data from one or more sensors. For example, the sensor data obtainer 114 may obtain or receive one or more frames and/or one or more poses. For instance, the sensor data obtainer 114 may receive image data from one or more image sensors 104 included in the electronic device 102 and/or from one or more remote image sensors. One or more of the frames may indicate or depict a 3D object (e.g., a face or other object). A frame may indicate or depict an object if the frame includes information (e.g., pixel information, depth data, etc.) corresponding to the object. For example, the frames may include pixel information corresponding to one or more non-rigid objects and/or depth data corresponding to the one or more non-rigid objects. A non-rigid object may be an object where at least a portion of the object is moveable (e.g., flexible) relative to at least another portion of the object. The one or more frames may be stored in the memory 126 as frame data 130.

In some configurations, the sensor data obtainer 114 may receive pose data from one or more pose sensors 122 included in the electronic device 102 and/or from one or more remote pose sensors. For example, the sensor data obtainer 114 may obtain one or more frames and/or one or more poses from one or more remote devices via the communication interface(s) 108. As used herein, a "pose" and/or "pose data" may include position information and/or orientation information. For example, a sensor pose or camera pose may indicate a pose of the sensor(s) and/or camera(s) when a frame is captured.

It should be noted that some frames and/or poses may differ. For example, the image sensor(s) 104 and/or the pose sensor(s) 122 may move between some frames. In some approaches, the image sensor(s) 104 and/or pose sensor(s) 122 may move due to motion of the electronic device 102 (e.g., smart phone, camera, vehicle, robot, etc.).

The processor 112 may include and/or implement a modeler 136. The modeler 136 may produce and/or update one or more canonical models. The canonical model(s) may be represented by and/or stored as the canonical model data 128 in the memory. A canonical model may be a representation of a volume (e.g., 3D space). For example, a canonical model may include a set of voxels that represent the volume and that may represent one or more objects in the volume. One or more objects in the volume may be represented by information associated with each voxel. Each voxel of the set of voxels may be included in the canonical model. In some configurations, the canonical model may include geometric information and/or optical information. For example, the canonical model may include geometric information and optical information in the sense that each voxel of the canonical model may be associated with geometric information and optical information.

In some configurations, the electronic device 102 may produce multiple canonical models. For example, the modeler 136 may produce a first canonical model and a second canonical model. In some configurations, the first canonical model and the second canonical model may be aligned. For instance, the first canonical model and the second canonical model may be aligned due to a registration between depth data and optical data. The registration may be performed by the electronic device 102 or may be predetermined.

The first canonical model may be initially generated and/or initialized from depth data of a frame. Generating and/or initializing a canonical model may include setting a geometry or shape (e.g., points, vertices, mesh, and/or surface, etc.) representing an object in a space. For example, the geometry of shape of an object may be set based on the depth data or a portion of the depth data to initialize the first canonical model. In some configurations, the first canonical model may not have a pre-assumption of a shape of an object.

The second canonical model may be generated and/or initialized from a 3D morphable model. A 3D morphable model may be a 3D model of an object that may be morphed or fitted to data representing an object. For example, the geometry or shape of an object may be set based on the 3D morphable model to initialize the second canonical model. One or more morphable models may be stored in memory 126 as 3D morphable model data 131. For example, a 3D morphable model may be a predetermined model that is stored on the electronic device 102, that is received from another device (e.g., from a networked device, external storage, etc.), and/or that is generated on the electronic device 102. In some examples, a 3D morphable model may be generated by receiving one or more inputs that indicate positions of points (e.g., vertices, feature points, etc.) and/or relationships between points (e.g., distance ranges between points, angular ranges between points, etc.). In some configurations, a 3D morphable model may have a predetermined number of vertices, connections, and/or polygons. For instance, a 3D morphable model and/or the second canonical model may have a fixed topology (e.g., a fixed number of vertices, connections between vertices, and/or triangles). The connections may indicate relationships between specific vertices, where each connection may consistently connect a specific pair of vertices. In some examples, the 3D morphable model may be a morphable model of a face. For instance, the 3D morphable model may be morphed or fitted to data (e.g., optical data and/or depth data) corresponding to a face. In some examples, the positions of the vertices and/or lengths of connections may be morphed or fitted to approximately conform to data. For instance, vertices of eyes of the 3D morphable model may be adjusted to approximately match the positions of eyes of a face in an image.

The modeler 136 may generate and/or initialize the canonical model(s). In some configurations, the canonical model(s) may be generated and/or initialized based on an initial frame. For example, the sensor data obtainer 114 may obtain depth data and/or optical data corresponding to a frame (e.g., an initial frame). In some configurations, the modeler 136 may map the depth data to a canonical coordinate system to produce a first canonical model. For example, the modeler 136 may utilize the depth data to construct a signed distance function field, which may be used as a canonical model. In some examples, a signed distance function field includes a set of voxels, where each of the voxels is assigned a value. For instance, depths of the depth data may indicate a surface of an object in 3D space. Voxels corresponding to the depths or the surface may be assigned a value (e.g., zero). For example, voxels with a zero value may indicate locations on the surface of the object. Other voxels may be assigned values according to a distance between the voxel and the surface or depth, where a sign of each value may indicate whether the voxel is within the object or outside of the object. For example, the signs of values may be relative to the surface of the object. For instance, if a voxel is outside of the object, the corresponding value may have a sign (e.g., negative sign). Or, if a voxel is inside of the object (e.g., enclosed in the object, beneath the object surface, etc.), the corresponding value may have a different sign (e.g., positive sign). In some approaches, a zero level isosurface of the signed distance function may be utilized to represent the shape of the object of the canonical model. An isosurface may be a surface formed via connecting voxels with the same discrete value (e.g., zero). In some examples, a zero level isosurface may be an isosurface where a voxel value of zero corresponds to a surface of an object.

It should be noted that another value (e.g., −1, 0.5, 1, 2, 5, etc.) may be utilized to represent voxels at the surface of the object in other examples. Additionally or alternatively, other values, signs, and/or scales may be utilized to represent voxels relative to the surface. For instance, voxels with a value of 1 may correspond to the surface of an object, voxels with a value less than 1 may correspond to voxels outside of the object, and voxels with a value greater than 1 may correspond to voxels inside of the object.

The processor 112 (e.g., modeler 136) may include and/or implement a fitter 120. The fitter 120 may fit a 3D morphable model to data. For example, a 3D morphable model may be fit to optical data, image data, depth data, and/or infrared data, etc., where the data may include and/or indicate features that correspond to points of the 3D morphable model. In some configurations, the fitter 120 may fit a 3D morphable model to the optical data (e.g., optical data of a frame). For instance, the fitter 120 may adjust the positions of vertices of the 3D morphable model to approximately match features of an object indicated by optical data of the frame. In some examples, the vertices of the 3D morphable model may be adjusted based on information of the optical data (e.g., information that may be determined from the optical data), such as facial landmarks. For example, the fitter 120 may adjust the positions of vertices of the 3D morphable model to approximately match and/or conform to corresponding features of the face, where the features of the face may be indicated in the optical data of a frame. For instance, the fitter 120 may position eye vertices of the 3D morphable model to approximately match the locations of eyes in the optical data, may position mouth corner vertices of the 3D morphable model to approximately match the locations of mouth corners in the optical data, may position a nose vertex of the 3D morphable model to approximately match the location of a tip of a nose in the optical data, etc. Fitting the 3D morphable model to the optical data may produce a fitted 3D morphable model. The modeler 136 may map the 3D morphable model (e.g., the fitted 3D morphable model) to a canonical coordinate system to produce (e.g., generate and/or initialize) the second canonical model.

The processor 112 (e.g., modeler 136) may include and/or implement a registerer 118. The registerer 118 may register data from one or more frames to one or more canonical models. For example, the sensor data obtainer 114 may receive optical data and/or depth data corresponding to a frame. The registerer 118 may register the depth data to a first canonical model. For example, the registerer 118 may register the depth data to the first canonical model by determining one or more deformations (e.g., translation, rotation, etc.) that approximately align the depth data to the first canonical model.

In some configurations, the registerer 118 may register the depth data to the first canonical model by performing a rigid registration and/or a non-rigid registration of the depth data to the first canonical model. In a rigid registration, for example, lengths and/or angles between points (e.g., vertices or pixels) in the data may be preserved through a deformation. For instance, a rigid registration may be performed by translating and/or rotating the data to align with a canonical model while preserving lengths and/or angles between points in the data. For example, a rigid registration may be performed by translating and/or rotating the depth data to align with the first canonical model while preserving lengths and/or angles between points in the depth data. Rigid registration may not include scaling. In some approaches, the rigid registration may be performed by reducing or minimizing an error between points of the depth data and points of an object in the first canonical model. Additionally or alternatively, a rigid registration may be performed by reducing or minimizing a point-to-plane distance of the depth data and the first canonical model. For the first canonical model, the electronic device 102 (e.g., registerer 118) may determine a point-to-plane distance between the depth data and the first canonical model. For instance, the point-to-plane distance may be determined as an inner product of an error between point(s) of the depth data and a normal of a surface (e.g., a surface of the first canonical model).

In some examples, a rigid registration may allow deforming all points in the data with one rigid matrix. In some approaches, rigid registration may be utilized to compensate for global frame movement (e.g., camera movement) and/or global movement of an object in the frame. It should be noted that some configurations of the systems and methods disclosed herein may not utilize an ROI (for registration and/or for reconstruction, for instance).

In a non-rigid registration, for example, some lengths and/or angles between points of the data may not be preserved through a deformation. For example, a portion or portions of the depth data may be moved relative to another portion of the depth data to align the portion or portions of the data to the first canonical model. For instance, non-rigid deformation may include rigid and non-rigid portions. In some approaches, non-rigid registration may utilize depth data (e.g., depth data from a current frame) and the first canonical model. For example, non-rigid registration may be performed by reducing or minimizing a point-to-plane distance between corresponding vertices of the depth data and the first canonical model. In some approaches, the non-rigid registration may be performed based on a rigid registration. For instance, non-rigid registration may be performed on depth data that has been rigidly registered. In some examples, portions of the rigidly registered depth data may be deformed while other portions of the rigidly registered depth data may not be deformed. Registering the depth data to the first canonical model may produce registered depth data.

In some configurations, the registerer 118 may register the 3D morphable model to a second canonical model. For example, the registerer 118 may register the 3D morphable model to the second canonical model by determining one or more deformations (e.g., translation, rotation, etc.) that approximately align the 3D morphable model to the second canonical model.

In some configurations, the registerer 118 may register the 3D morphable model to the second canonical model by performing a rigid registration and/or a non-rigid registration of the 3D morphable model to the second canonical model. For instance, a rigid registration may be performed by translating and/or rotating the 3D morphable model to align with the second canonical model while preserving lengths and/or angles between points in the 3D morphable model. In some approaches, the rigid registration may be performed by reducing or minimizing an error between points of the 3D morphable model and points of an object in the second canonical model. Additionally or alternatively, a rigid registration may be performed by reducing or minimizing a point-to-plane distance of the 3D morphable model and the second canonical model. For the second canonical model, the electronic device 102 (e.g., registerer 118) may determine a point-to-plane distance between the 3D morphable model and the second canonical model. For instance, the point-to-plane distance may be determined as an inner product of an error between point(s) of the 3D morphable model and a normal of a surface (e.g., a surface of the second canonical model).

In some examples, non-rigid registration may be performed between the 3D morphable model (e.g., the rigidly registered 3D morphable model) and the second canonical model. In a non-rigid registration, for example, a portion or portions of the 3D morphable model may be moved relative to another portion of the 3D morphable model to align the portion or portions of the data to the second canonical model. For instance, non-rigid registration may be performed by reducing or minimizing a point-to-plane distance between corresponding vertices of the 3D morphable model and the second canonical model.

The processor 112 may include and/or implement a reconstructor 124. The reconstructor 124 may produce a 3D object reconstruction based on the registered depth data and the registered 3D morphable model. The term "reconstruct" and variations thereof may include producing a 3D model of the 3D object. For example, the reconstructor 124 may produce a virtual model of the 3D object in a virtual space.

In some configurations, reconstructing the 3D object based on the registered depth data and the registered 3D morphable model may include extracting an isosurface of the 3D object from the canonical models. For example, the reconstructor 124 may extract an isosurface from the canonical models.

In some configurations, depths from the depth data may be fused to a canonical model based on the registration (e.g., rigid and/or non-rigid registration). In some approaches, one or more registered depths (from a current frame, for instance) are fused (e.g., incrementally fused) to a distance transform field or signed distance function field. For instance, a distance transform field may include values assigned to voxels of the canonical model(s), where voxels corresponding to the surface of the 3D object may be assigned a value (e.g., zero), and other voxels may be assigned values according to the voxels' respective distances to the surface. A signed distance function field may include values assigned to voxels of the canonical model(s), where voxels corresponding to the surface of an object may have a value (e.g., zero), and other voxels may have other values based on distances to the surface, where a sign of each value indicates whether the voxel is within or outside of the object. A zero level set of the distance transform field (e.g., voxels with a value of zero) or signed distance function field may be used to represent the surface of the 3D object. In some approaches, the reconstructor 124 may perform marching cubes to extract the zero-level isosurface. For instance, performing marching cubes may include extracting a polygon mesh from the distance transform field. In some examples, the electronic device 102 (e.g., reconstructor 124) may render the isosurface or polygon mesh for presentation. The reconstructed 3D object may be presented (e.g., shown on a display, sent to another electronic device, printed with a 3D printer, etc.). In some configurations, the 3D object reconstruction is a 3D facial model.

In some configurations, the electronic device 102 (e.g., processor 112) may utilize the reconstructed 3D object to perform one or more operations. For example, the electronic device 102 may utilize a reconstruction of a face to perform facial authentication, facial recognition, and/or animation. For instance, the electronic device 102 may compare a 3D facial reconstruction to one or more predetermined 3D facial models for authentication or facial recognition. If the 3D facial reconstruction matches (e.g., matches within a threshold range) a predetermined 3D facial model, the electronic device 102 may recognize the face as an identity associated with the 3D facial model and/or may authenticate a user as being authorized to access one or more functions of the electronic device 102 (e.g., smart phone, tablet device, computer, etc.). Additionally or alternatively, the electronic device 102 may utilize a 3D facial reconstruction to perform an animation (of a facial model or emoji, for example). For instance, a movement of a face relative to the 3D facial reconstruction may be utilized to animate expressions of a facial model or emoji, where the animation may be presented by the electronic device 102 or sent to another device for presentation.

In some configurations, the processor 112 (e.g., modeler 136) may include and/or implement a selector 116. In some cases, some samples (e.g., vertices, points, etc.) of the 3D morphable model corresponding to a frame may lack accuracy due to limitations of the 3D morphable model and/or noise in the depth image. For instance, while the 3D morphable model may be fitted to data from a frame, some samples of the 3D morphable model may not accurately conform to the actual object. The selector 116 may select one or more samples of the 3D morphable model. The selected samples may more accurately represent the 3D object and may be utilized to reconstruct the 3D object. Other less accurate samples may be rejected and not utilized to reconstruct the 3D object. For instance, the selector 116 may be utilized to select samples that more accurately represent the actual face of a person.

In some configurations, the selector 116 may determine one or more normals of respective samples of the depth data. For example, the selector 116 may calculate a geometrical normal of a sample of the depth data by calculating a cross product of partial derivatives of the depth data. A normal of the depth data may be denoted $N(v)^D$, where N denotes a normal, v denotes a sample or vertex, and D denotes depth data.

The selector 116 may determine one or more normals of respective samples of the 3D morphable model. For example, the selector 116 may calculate a geometrical normal of a sample of the 3D morphable model by calculating a cross product of partial derivatives of the 3D morphable model. A normal of the 3D morphable model may be denoted $N(v)^{3DMM}$, where N denotes a normal, v denotes a sample or vertex, and 3DMM denotes a 3D morphable model.

In some configurations, the selector 116 may determine whether to select each of the samples of the 3D morphable model based on a first normal (of the depth data, $N(v)^D$) and a corresponding second normal (of the depth data, $N(v)^{3DMM}$). For example, the selector 116 may determine an inner product of the corresponding first normal and the corresponding second normal. The selector 116 may compare the inner product to a threshold to determine whether to select a sample of the 3D morphable model. In some examples, determining whether to select a sample of the 3D morphable model may be performed in accordance with Equation (1).

$$\langle N(v)^{3DMM}, N(v)^D \rangle > th \qquad (1)$$

In Equation (1), $\langle \rangle$ denotes an inner product and th denotes a threshold. For example, when the normal of the depth data and the normal of the 3D morphable model are on the same smooth surface, the inner product tends toward 1. Otherwise, the inner product may tend towards 0, which may indicate that the sample of the 3D morphable model is inaccurate. Examples of the threshold may include 0.6, 0.75, 0.8, 0.9, 0.85, etc.

In some configurations, determining whether to select each of the samples of the 3D morphable model may include selecting a sample in response to determining that the inner product is greater than the threshold. For example, the selector 116 may select a sample if the inner product for that sample is greater than the threshold. In some configurations, determining whether to select each of the samples of the 3D morphable model may include rejecting a sample in response to determining that the inner product is not greater than the threshold (e.g., is less than or equal to the threshold). For example, the selector 116 may reject a sample if the inner product for that sample is not greater than the threshold. An example of sample selection determination is given in connection with FIG. 8.

In some configurations, the selector 116 may perform the selection determination on samples before registration of those samples. For example, samples of the 3D morphable model may be selected before registration to improve the accuracy of the 3D morphable model. The selection determination may help to select more reliable samples for the registration. The selector 116 may not be implemented and/or utilized in some approaches of the systems and methods described herein.

In some configurations, producing the 3D object reconstruction may be based on the selected samples of the 3D morphable model. For example, the reconstructor 124 may use the selected samples to produce the 3D object reconstruction. For instance, the selected samples may be fused into a canonical model and/or the rejected samples may not be fused into the canonical model. Additionally or alternatively, the reconstructor 124 may not use rejected samples to produce the 3D object reconstruction.

In some configurations, the electronic device 102 (e.g., processor 112) may optionally be coupled to, be part of (e.g., be integrated into), include, and/or implement one or more kinds of devices. For example, the electronic device 102 may be implemented in a vehicle equipped with one or more cameras. In another example, the electronic device 102 may be implemented in a drone equipped with one or more cameras. In other examples, the electronic device 102 (e.g., processor 112) may be implemented in a computer, camera, server, or a smartphone.

In some configurations, one or more of the components or elements described in connection with FIG. 1 may be combined and/or divided. For example, the modeler 136 and/or reconstructor 124 may be combined into an element that performs the functions of the modeler 136 and the reconstructor 124. In another example, the modeler 136 may be divided into a number of separate components or elements that perform a subset of the functions associated with the modeler 136.

Figure 2:
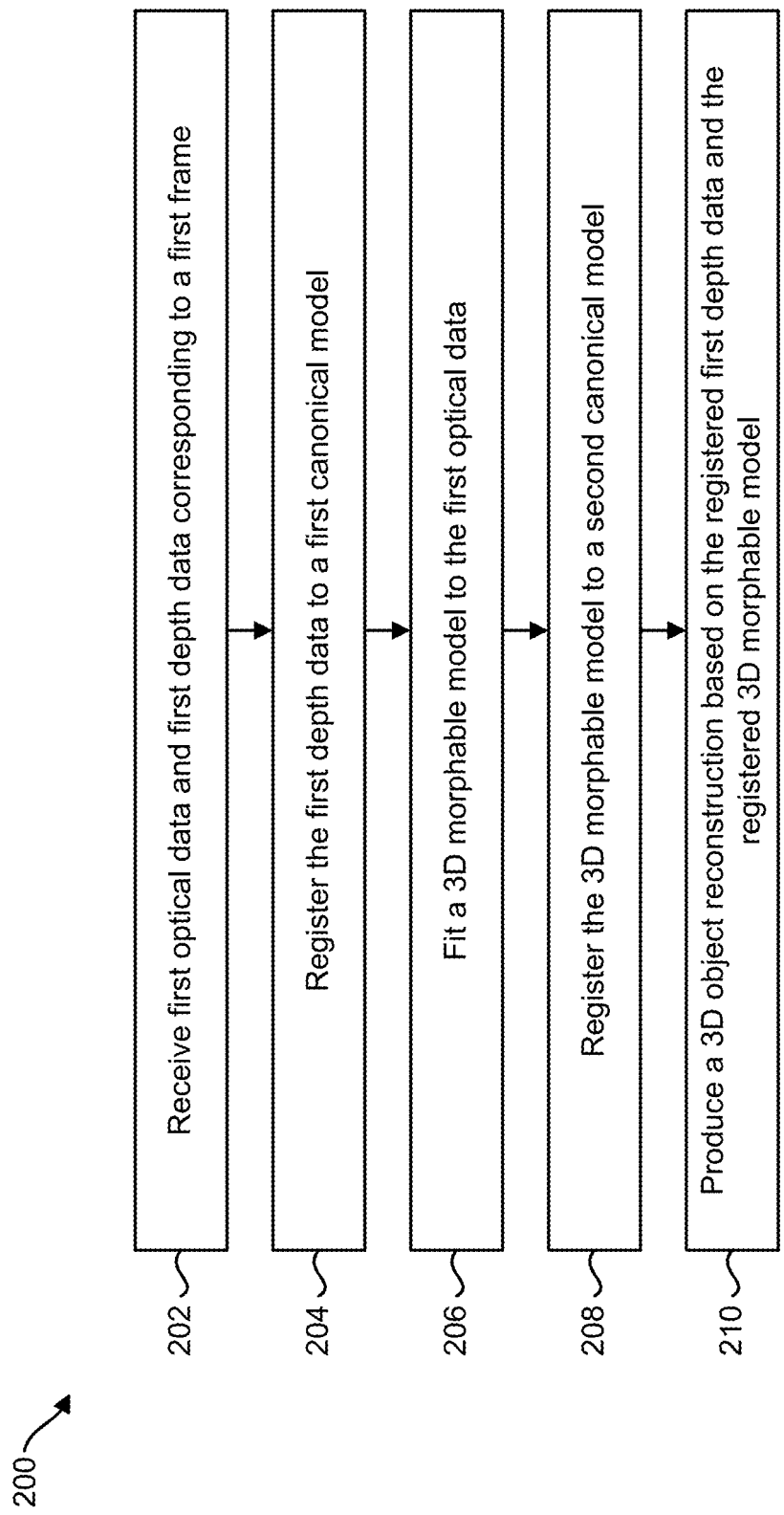
FIG. 2 is a flow diagram illustrating one configuration of a method for reconstructing a 3D object.

FIG. 2 is a flow diagram illustrating one configuration of a method 200 for reconstructing a 3D object. The method 200 may be performed by the electronic device 102 described in connection with FIG. 1. The electronic device 102 may receive 202 first optical data and first depth data corresponding to a first frame. This may be accomplished as described in connection with FIG. 1. For example, the electronic device 102 may obtain sensor data (e.g., one or more image frames and/or one or more depth image frames).

The electronic device 102 may register 204 the first depth data to a first canonical model. This may be accomplished as described in connection with FIG. 1. For example, the electronic device 102 may perform a rigid registration and/or a non-rigid registration of the first depth data to approximately align the first depth data to the first canonical model.

The electronic device 102 may fit 206 a 3D morphable model to the first optical data. This may be accomplished as described in connection with FIG. 1. For example, the electronic device 102 may adjust the positions of vertices and/or lengths of connections of the 3D morphable model to the first optical data.

The electronic device 102 may register 208 the 3D morphable model to a second canonical model. This may be accomplished as described in connection with FIG. 1. For example, the electronic device 102 may perform a rigid registration and/or a non-rigid registration of the fitted 3D morphable model to approximately align the 3D morphable model to the second canonical model.

The electronic device 102 may produce 210 a 3D object reconstruction based on the registered first depth data and the registered 3D morphable model. This may be accomplished as described in connection with FIG. 1. For example, the electronic device 102 may extract an isosurface of the 3D object based on the registered first depth data and the registered 3D morphable model to produce a reconstructed 3D object.

In some configurations, the electronic device 102 may display the reconstructed 3D object. For example, the electronic device 102 may display the reconstructed 3D object on one or more displays (e.g., monitor, smartphone display, television, virtual reality headset displays, augmented reality headset displays, etc.), send the reconstructed 3D object to another electronic device, and/or print a model of the reconstructed 3D object with a 3D printer, etc. In some configurations, the electronic device 102 may store the reconstructed 3D object in memory. In some configurations, the electronic device 102 may enable manipulation of the reconstructed 3D object. For example, the electronic device 102 may receive input via one or more input devices to enable shifting, rotating, and/or modifying the reconstructed 3D object.

In some configurations, the electronic device 102 may perform one or more operations with the reconstructed 3D model. For example, the reconstructed 3D model may be transmitted to a remote device (e.g., cloud device, remote server, and/or one or more vehicles). The electronic device 102 and/or a remote device may utilize the reconstructed 3D model in generating and/or updating a virtual environment in some approaches. In yet another example, the electronic device 102 may segment one or more objects from a scene based on the reconstructed 3D model. In yet another example, the electronic device 102 may present the reconstructed 3D model for viewing and/or manipulation. In yet another example, the electronic device 102 may generate augmented reality content based on the reconstructed 3D model. For instance, the electronic device 102 may insert one or more virtual objects (e.g., people, structures, virtual furniture, and/or environmental effects, etc.) into the reconstructed 3D model.

It should be noted that some configurations of the systems and methods disclosed herein may be performed online. For example, the electronic device 102 may perform registration and/or reconstruction while one or more frames are being received (e.g., captured). For instance, registration and/or reconstruction may be performed based on one or more frames as they are being received and/or captured, before all of the frames for a 3D object are received and/or captured. In other configurations, the electronic device 102 may perform registration and/or reconstruction "offline," after all of the frames for a 3D object are received and/or captured.

Figure 3:
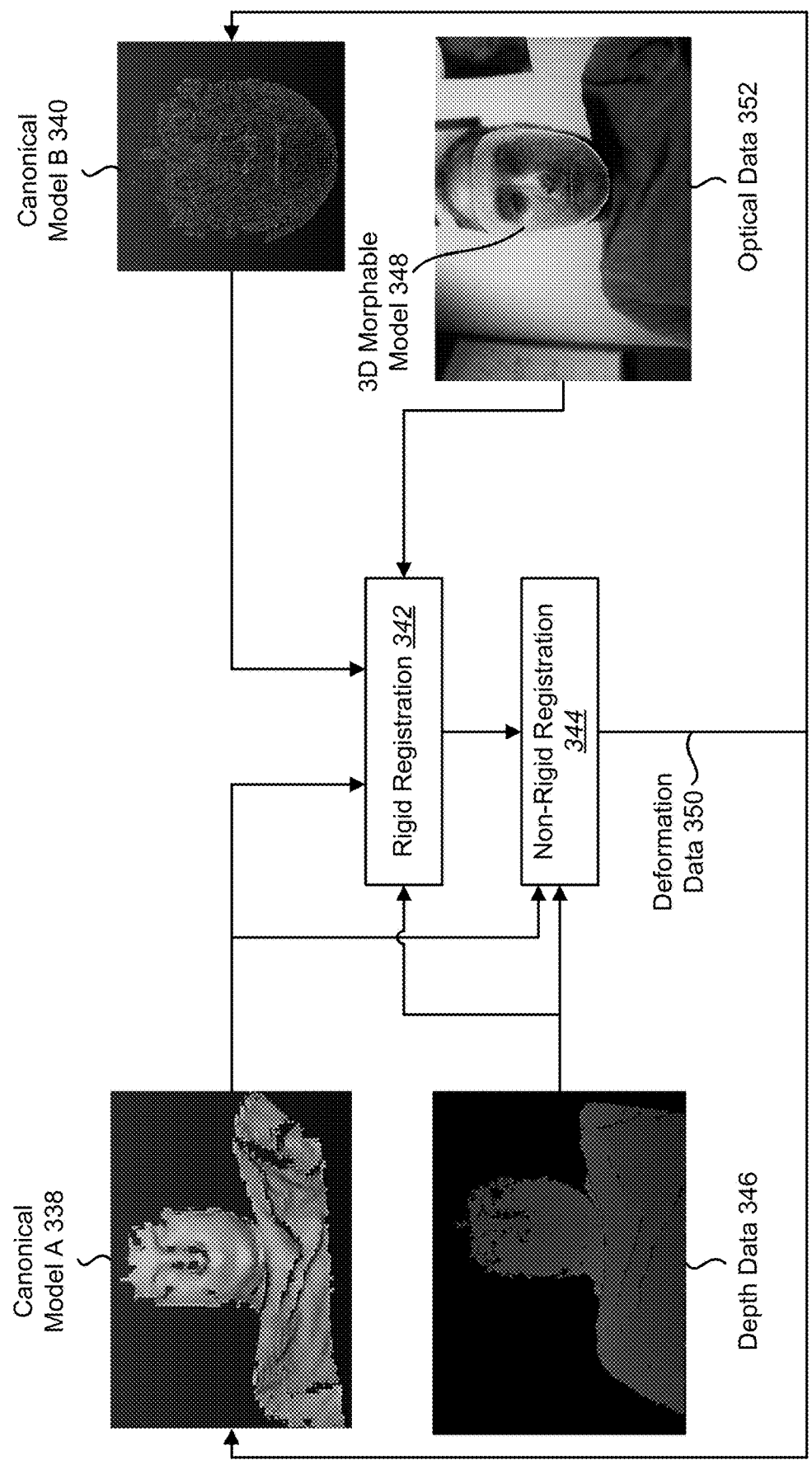
FIG. 3 is a block diagram illustrating an example of registration in accordance with some of the systems and methods described herein.

FIG. 3 is a block diagram illustrating an example of registration in accordance with some of the systems and methods described herein. In particular, FIG. 3 illustrates a rigid registration function 342 and a non-rigid registration function 344. In some configurations, the rigid registration function 342 and the non-rigid registration function 344 may be performed by the registerer 118 described in connection with FIG. 1 and/or may be performed as described in connection with FIG. 2. For instance, a point-to-plane distance between the depth data 346 and canonical model A 338, and a point-to-plane distance between the 3D morphable model 348 and canonical model B 340 may be utilized to perform rigid registration. In some examples, a same rigid transformation may be shared between canonical model A 338 and canonical model B 340.

Canonical model A 338 and canonical model B 340 are also illustrated in FIG. 3. Canonical model A 338 may be an example of the first canonical model described in connection with FIG. 1 and/or FIG. 2. Canonical model B 340 may be an example of the second canonical model described in connection with FIG. 1 and/or FIG. 2. For instance, canonical model A 338 may be established or initialized based on an initial frame and/or canonical model B 340 may be established or initialized based on the initial frame.

As described above, an electronic device may receive depth data 346 and optical data 352 corresponding to a frame. The depth data 346 may be registered to canonical model A 338 with the rigid registration function 342 and the non-rigid registration function 344. A 3D morphable model 348 may be fitted to the optical data 352. The fitted 3D morphable model 348 may be registered to canonical model B 340 with the rigid registration function 342 and the non-rigid registration function 344.

The rigid registration function 342 and the non-rigid registration function 344 may produce deformation data 350. The deformation data 350 may indicate one or more deformations or transformations (e.g., rigid and/or non-rigid deformations or transformations) to register the depth data 346 to canonical model A 338 and/or to register the 3D morphable model 348 to canonical model B 340. The deformation data 350 may be utilized to combine one or more samples of the depth data 346 with canonical model A 338. Additionally or alternatively, the deformation data 350 may be utilized to combine one or more samples of the 3D morphable model 348 with canonical model B 340. The procedures described in connection with FIG. 3 may be performed for one or more frames. For example, as a current frame is received, registration may be performed on the depth data to canonical model A 338 and on the optical data 352 to canonical model B 340. Similar procedures may be performed for subsequent frames.

As described in connection with FIG. 3, some configurations of the systems and methods disclosed herein may perform non-rigid 3D object reconstruction with a 3D morphable model. For example, a 3D morphable model 348 may be utilized as a prior in some configurations. In some examples, the rigid registration function 342 and the non-rigid registration function 344 may provide a hybrid global rigid deformation and local non-rigid deformation.

Figure 4:
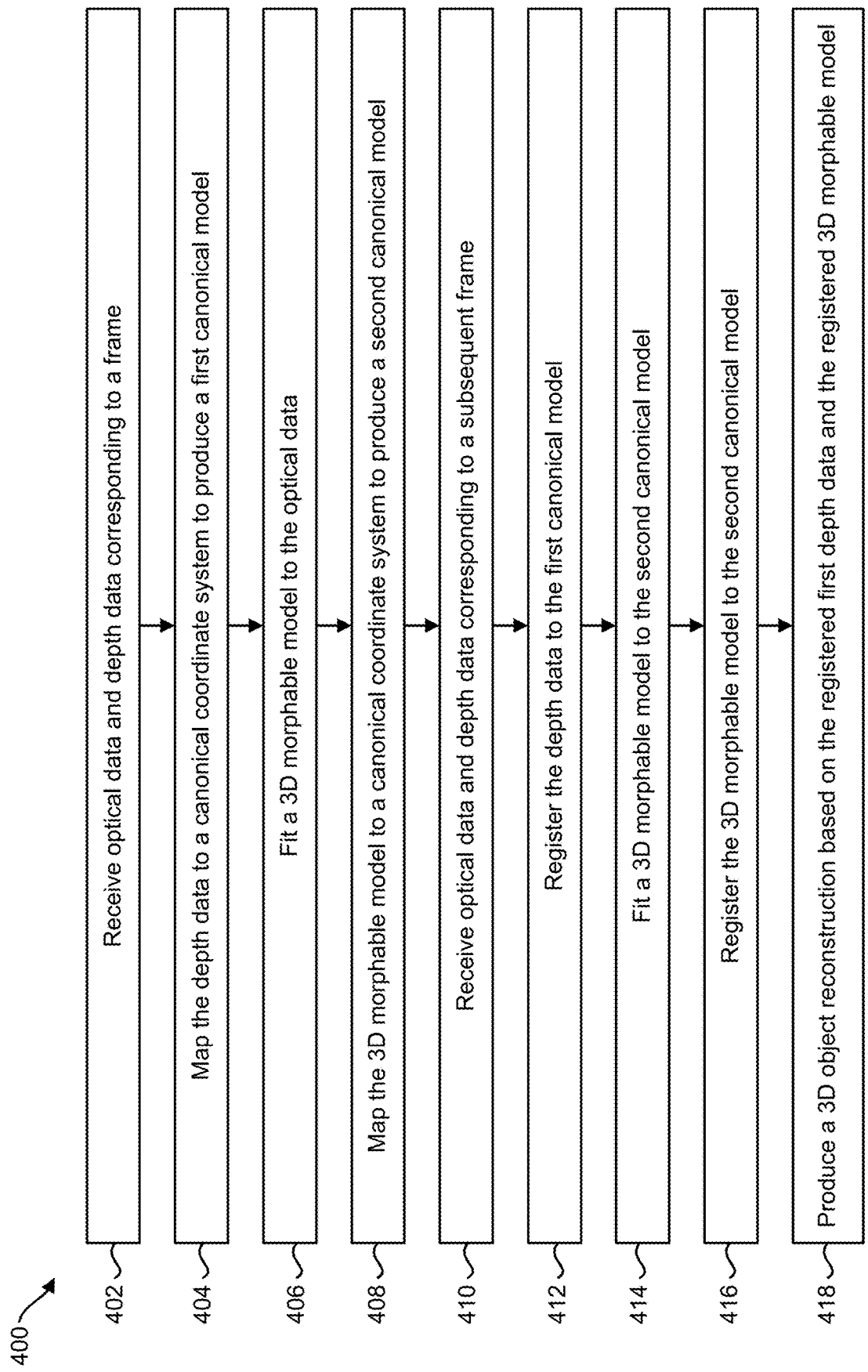
FIG. 4 is a flow diagram illustrating another configuration of a method for reconstructing a 3D object.

FIG. 4 is a flow diagram illustrating another configuration of a method 400 for reconstructing a 3D object. The method 400 may be performed by the electronic device 102 described in connection with FIG. 1. The electronic device 102 may receive 402 optical data and depth data corresponding to a frame. The frame may be previous to one or more subsequent frames. The optical data and/or depth data may be utilized to establish or initialize a first canonical model and a second canonical model.

The electronic device 102 may map 404 the depth data to a canonical coordinate system to produce or update a first canonical model. This may be accomplished as described in connection with FIG. 1. For example, mapping 404 the depth data to a canonical coordinate system may establish, initialize, or update the first canonical model.

The electronic device 102 may fit 406 a 3D morphable model to the optical data. This may be accomplished as described in connection with FIG. 1.

The electronic device 102 may map 408 the fitted 3D morphable model to a canonical coordinate system to produce a second canonical model. This may be accomplished as described in connection with FIG. 1. For example, fitting 406 the 3D morphable model to the optical data and mapping 408 the fitted 3D morphable model to a canonical coordinate system may establish or initialize the second canonical model.

The electronic device 102 may receive 410 optical data and depth data corresponding to a subsequent frame. This may be accomplished as described in connection with FIG. 1.

The electronic device 102 may register 412 the depth data to the first canonical model. This may be accomplished as described in connection with FIG. 1. For example, the electronic device 102 may perform a rigid registration and/or a non-rigid registration of the depth data to approximately align the first depth data to the first canonical model that was initialized previously.

The electronic device 102 may fit 414 a 3D morphable model to the optical data. This may be accomplished as described in connection with FIG. 1. For example, the electronic device 102 may adjust the positions of vertices and/or lengths of connections of another 3D morphable model to the optical data of the subsequent frame.

The electronic device 102 may register 416 the 3D morphable model to the second canonical model. This may be accomplished as described in connection with FIG. 1. For example, the electronic device 102 may perform a rigid registration and/or a non-rigid registration of the fitted 3D morphable model to approximately align the fitted 3D morphable model that corresponds to the subsequent frame to the second canonical model.

The electronic device 102 may produce 418 a 3D object reconstruction based on the registered first depth data and the registered 3D morphable model. This may be accomplished as described in connection with FIG. 1. For example, the electronic device 102 may extract an isosurface of the 3D object based on the registered first depth data and the registered 3D morphable model to produce a reconstructed 3D object.

Figure 5:
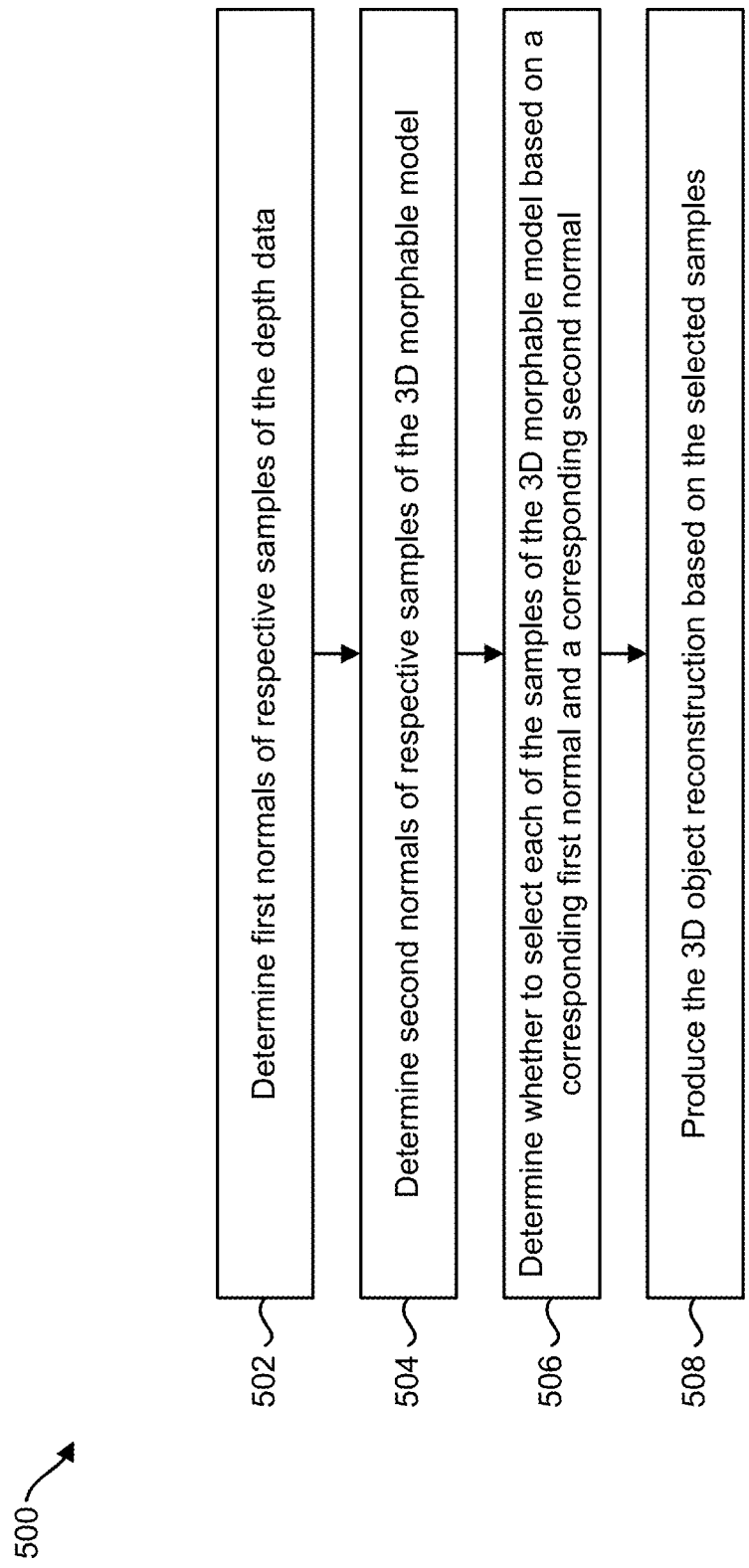
FIG. 5 is a flow diagram illustrating one configuration of a method for selecting samples of a 3D morphable model.

FIG. 5 is a flow diagram illustrating one configuration of a method 500 for selecting samples of a 3D morphable model. The method 200 may be performed by the electronic device 102 described in connection with FIG. 1. The electronic device 102 may determine 502 first normals of respective samples of the depth data. This may be accomplished as described in connection with FIG. 1. For example, the electronic device 102 may calculate normals corresponding to samples of depth data corresponding to a frame. In some examples, the normals may be determined 502 from depth data that is registered to a canonical model.

The electronic device 102 may determine 504 second normals of respective samples of the 3D morphable model. This may be accomplished as described in connection with FIG. 1. For example, the electronic device 102 may calculate normals corresponding to samples of the 3D morphable model corresponding to a frame. In some examples, the normals may be determined 502 from a 3D morphable model that is fitted to frame data and/or registered to a canonical model. It should be noted that ordinal numbers (e.g., first, second, third, etc.) may be utilized to distinguish items and/or may not necessarily denote a particular order.

The electronic device 102 may determine 506 whether to select each of the samples of the 3D morphable model based on a corresponding first normal and a corresponding second normal. This may be accomplished as described in connection with FIG. 1. For example, the electronic device 102 may determine whether each of the samples meets an accuracy criterion based on the first normal and the second normal. In some approaches, the electronic device 102 may determine an inner product of the first normal and the second normal and compare the inner product to a threshold for one or more of the samples to determine whether to select the one or more samples.

The electronic device 102 may produce 508 a 3D object reconstruction based on the selected samples. This may be accomplished as described in connection with FIG. 1. For example, the electronic device 102 may extract an isosurface of the 3D object based on the registered first depth data and the selected samples of the registered 3D morphable model to produce a reconstructed 3D object.

Figure 6:
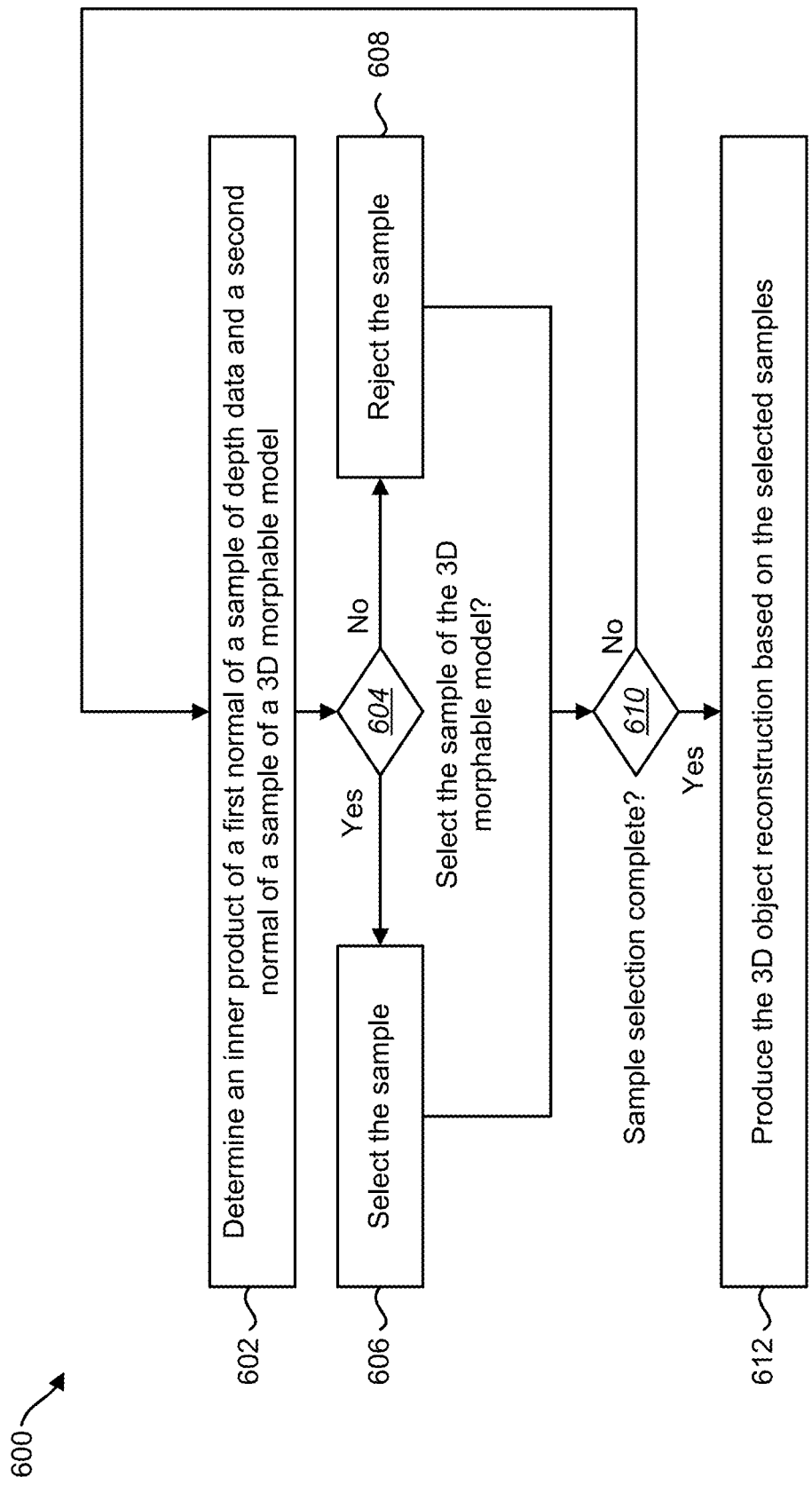
FIG. 6 is a flow diagram illustrating one configuration of a method for determining whether to select samples of a 3D morphable model.

FIG. 6 is a flow diagram illustrating one configuration of a method 600 for determining whether to select samples of a 3D morphable model. The method 600 may be performed by the electronic device 102 described in connection with FIG. 1. The electronic device 102 may determine 602 an inner product of a first normal of a sample of depth data and a second normal of a sample of a 3D morphable model. This may be accomplished as described in connection with FIG. 1. For example, the electronic device 102 may calculate an inner product of normal corresponding to a sample of depth data and a sample of a 3D morphable model. In some examples, the inner product may be a value between 0 and 1.

The electronic device 102 may determine 604 whether to select the sample of the 3D morphable model. This may be accomplished as described in connection with FIG. 1. For example, the electronic device 102 may compare the inner product to a threshold. In some approaches, the threshold may be satisfied if the inner product is greater than the threshold. In some approaches, the threshold may be satisfied in the inner product is greater than or equal to the threshold. In other approaches, other values based on the inner product and/or other criteria may be utilized.

In a case that the electronic device 102 determines to select the sample, the electronic device 102 may select 606 the sample. This may be accomplished as described in connection with FIG. 1. For example, the electronic device 102 may retain the sample, store the sample, label the sample, and/or combine the sample with a canonical model.

In a case that the electronic device 102 determines to not select the sample, the electronic device 102 may reject 608 the sample. This may be accomplished as described in connection with FIG. 1. For example, the electronic device 102 may discard, remove, not label, and/or not utilize, etc., the sample. For instance, a sample that is not selected may not be combined with a canonical model.

The electronic device 102 may determine 610 whether sample selection is complete. For example, the electronic device 102 may determine whether each of the samples (or each of a subset of the samples) of the 3D morphable model has been evaluated for selection. If sample selection is not complete, operation may return to determining 602 an inner product for a next sample.

In a case that sample selection is complete, the electronic device 102 may produce 612 a 3D object reconstruction based on the selected samples. This may be accomplished as described in connection with FIG. 1. For example, the electronic device 102 may extract an isosurface of the 3D object based on the registered first depth data and the selected samples of the registered 3D morphable model to produce a reconstructed 3D object. In some approaches, the electronic device 102 may perform registration based on the selected samples, after which the electronic device 102 may produce 612 the 3D object reconstruction.

Figure 7:
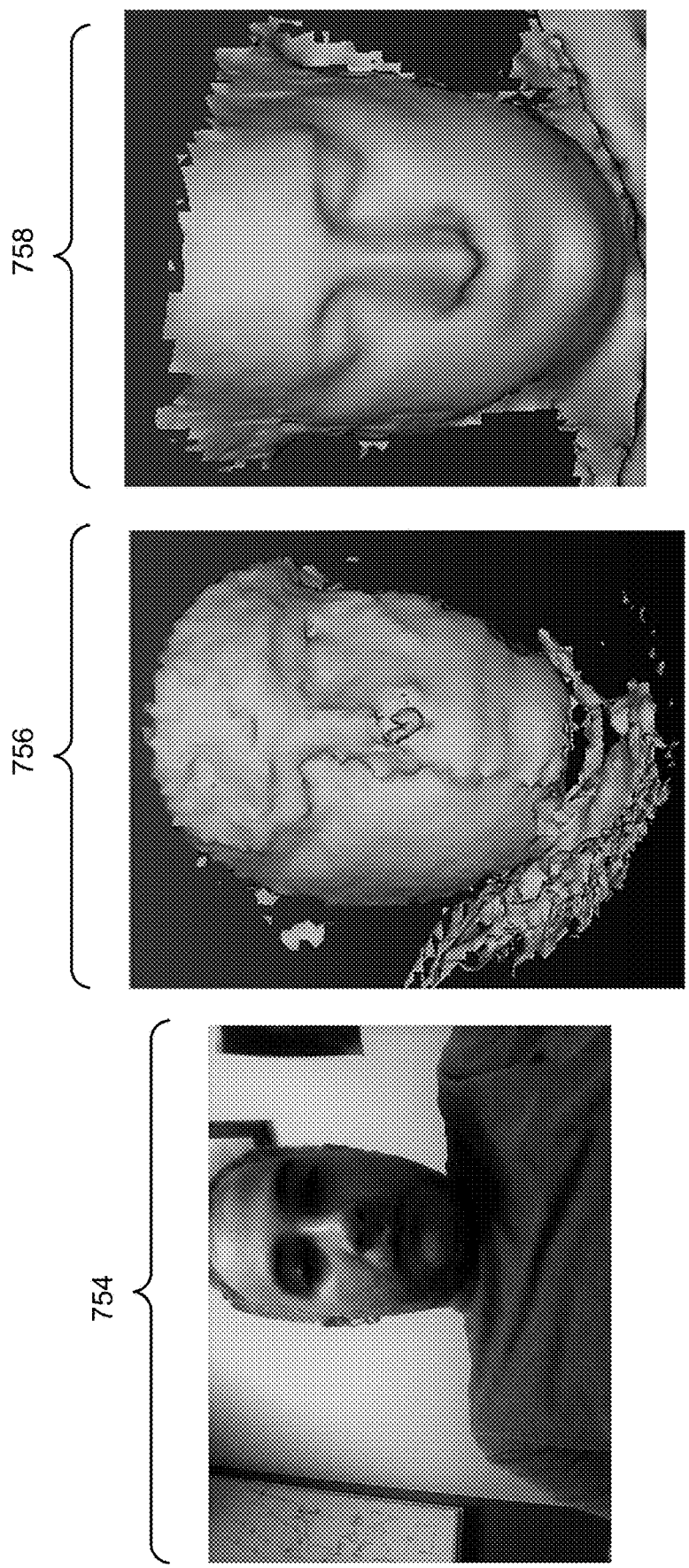
FIG. 7 is a diagram illustrating an example of a 3D facial model visualization in accordance with some examples of the systems and methods described herein.

FIG. 7 is a diagram illustrating an example of a 3D facial model visualization 758 in accordance with some examples of the systems and methods described herein. In particular, FIG. 7 illustrates an example of optical data 754, a visualization 756 of a model produced without utilizing the techniques disclosed herein, and the 3D facial model visualization 758 produced utilizing an example of the techniques disclosed herein.

As illustrated in FIG. 7, the visualization 756 is degraded due to a loss of correspondence between frames. The 3D facial model visualization 758 illustrates improved structure and appearance in accordance with some of the techniques described herein. For example, the 3D facial model visualization 758 is produced utilizing two canonical models and the 3D morphable model as described herein.

FIG. 8 is a diagram illustrating an example of sample selection determination in accordance with some examples of the systems and methods described herein. In particular, FIG. 8 illustrates a 3D morphable model 860, an image 862 of a face with a projection of the 3D morphable model, and depth data 864 corresponding to a frame. The 3D morphable model 860 and the depth data 864 may be utilized to determine a selection of samples of the 3D morphable model 860 as described in connection with FIG. 1. For instance, a normal of a sample of the 3D morphable model 860 may be determined and a normal of a sample of the depth data 864 may be determined. An inner product of the corresponding normals may be determined. The inner product may be compared to a threshold. If the inner product is greater than the threshold, then the sample of the 3D morphable model may be accepted. Otherwise, the sample may be rejected. The determination selection may be performed for multiple (e.g., all) samples of the 3D morphable model. For instance, the 3D morphable model may be projected to the image 862, which may be utilized to get corresponding samples of the depth data in order to determine which samples of the 3D morphable model more accurately represent the actual face. FIG. 8 illustrates an example of samples 866 of a 3D morphable model, and selected samples 868 of the 3D morphable model. The selected samples 868 may be utilized for registration and/or reconstruction. Rejected samples may be discarded and/or not utilized.

Figure 9:
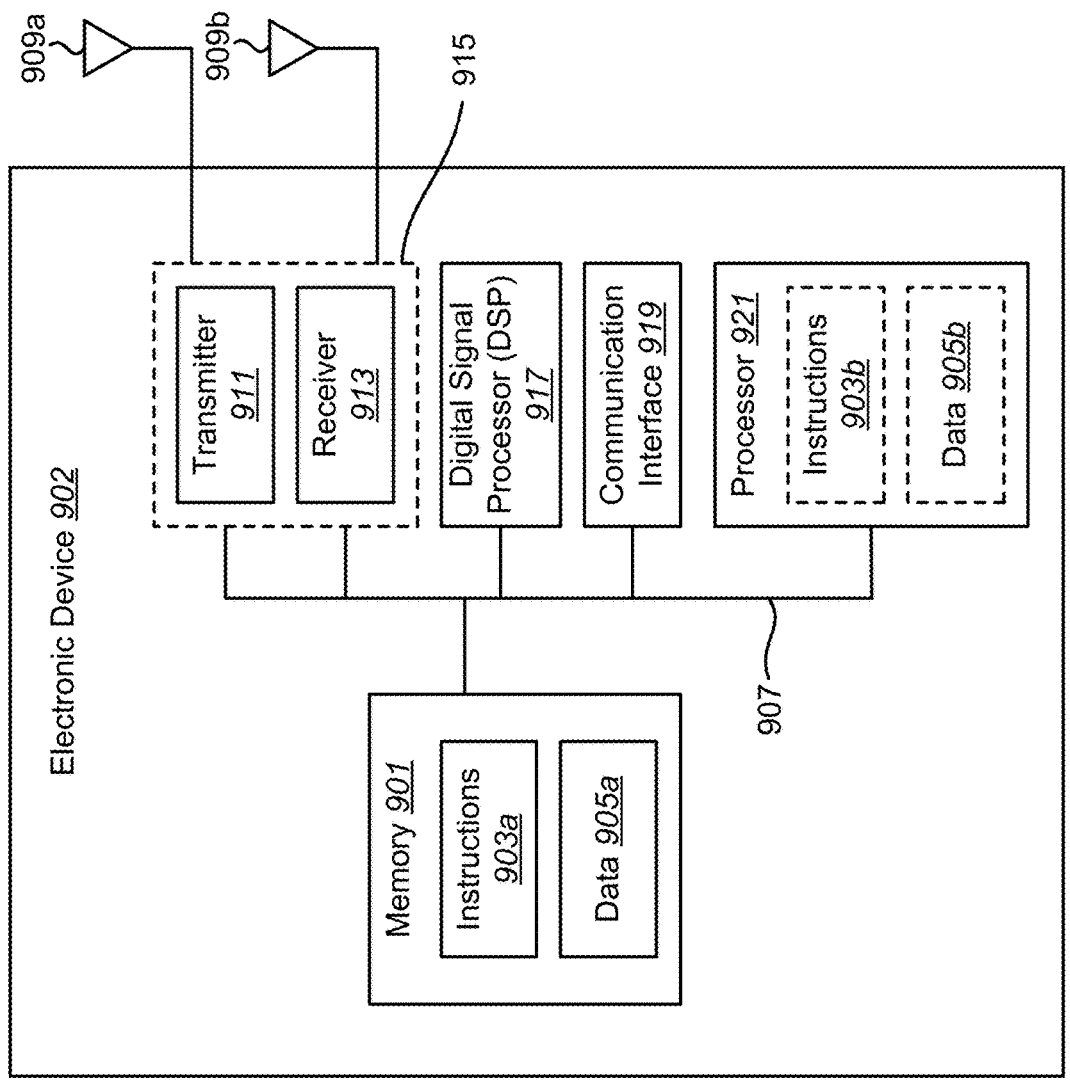
FIG. 9 illustrates certain components that may be included within an electronic device configured to implement various configurations of the systems and methods disclosed herein.

FIG. 9 illustrates certain components that may be included within an electronic device 902 configured to implement various configurations of the systems and methods disclosed herein. Examples of the electronic device 902 may include servers, cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, mounted cameras, connected cameras, robots, aircraft, drones, unmanned aerial vehicles (UAVs), gaming consoles, personal digital assistants (PDAs), etc. The electronic device 902 may be implemented in accordance with one or more of the electronic devices (e.g., electronic device 102) described herein.

The electronic device 902 includes a processor 921. The processor 921 may be a general purpose single- or multi-chip microprocessor (e.g., an ARM), a special purpose microprocessor (e.g., a digital signal processor (DSP)), a microcontroller, a programmable gate array, etc. The processor 921 may be referred to as a central processing unit (CPU). Although just a single processor 921 is shown in the electronic device 902, in an alternative configuration, a combination of processors (e.g., an ARM and DSP) could be implemented.

The electronic device 902 also includes memory 901. The memory 901 may be any electronic component capable of storing electronic information. The memory 901 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 905a and instructions 903a may be stored in the memory 901. The instructions 903a may be executable by the processor 921 to implement one or more of the methods, procedures, steps, and/or functions described herein. Executing the instructions 903a may involve the use of the data 905a that is stored in the memory 901. When the processor 921 executes the instructions 903, various portions of the instructions 903b may be loaded onto the processor 921 and/or various pieces of data 905b may be loaded onto the processor 921.

The electronic device 902 may also include a transmitter 911 and/or a receiver 913 to allow transmission and reception of signals to and from the electronic device 902. The transmitter 911 and receiver 913 may be collectively referred to as a transceiver 915. One or more antennas 909a-b may be electrically coupled to the transceiver 915. The electronic device 902 may also include (not shown) multiple transmitters, multiple receivers, multiple transceivers and/or additional antennas.

The electronic device 902 may include a digital signal processor (DSP) 917. The electronic device 902 may also include a communication interface 919. The communication interface 919 may allow and/or enable one or more kinds of input and/or output. For example, the communication interface 919 may include one or more ports and/or communication devices for linking other devices to the electronic device 902. In some configurations, the communication interface 919 may include the transmitter 911, the receiver 913, or both (e.g., the transceiver 915). Additionally or alternatively, the communication interface 919 may include one or more other interfaces (e.g., touchscreen, keypad, keyboard, microphone, camera, etc.). For example, the communication interface 919 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 907.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refer to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. It should also be noted that one or more steps and/or actions may be added to the method(s) and/or omitted from the method(s) in some configurations of the systems and methods disclosed herein.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and electronic device described herein without departing from the scope of the claims.

What is claimed is:

1. A method performed by an electronic device, comprising:
   receiving first optical data and first depth data corresponding to a first frame;
   registering the first depth data to a first canonical model;
   fitting a three-dimensional (3D) morphable model to the first optical data;
   registering the 3D morphable model to a second canonical model; and
   producing a 3D object reconstruction based on the registered first depth data and the registered 3D morphable model, wherein producing the 3D object reconstruction comprises extracting an isosurface from the first canonical model and the second canonical model.

2. The method of claim 1, wherein registering the first depth data comprises performing at least one of a rigid registration and a non-rigid registration of the first depth data.

3. The method of claim 1, wherein registering the 3D morphable model comprises performing at least one of a rigid registration and a non-rigid registration of the 3D morphable model.

4. The method of claim 1, further comprising:
   receiving second depth data corresponding to a second frame that is previous to the first frame; and
   mapping the second depth data to a canonical coordinate system to update the first canonical model.

5. The method of claim 1, further comprising:
   receiving second optical data corresponding to a second frame that is previous to the first frame;
   fitting a second 3D morphable model to the second optical data; and
   mapping the second 3D morphable model to a canonical coordinate system to produce the second canonical model.

6. The method of claim 1, further comprising:
   determining first normals of respective samples of the first depth data;
   determining second normals of respective samples of the 3D morphable model; and
   determining whether to select each of the samples of the 3D morphable model based on a corresponding first normal and a corresponding second normal.

7. The method of claim 6, wherein determining whether to select each of the samples of the 3D morphable model comprises:
   determining an inner product of the corresponding first normal and the corresponding second normal; and
   comparing the inner product to a threshold.

8. The method of claim 7, wherein determining whether to select each of the samples of the 3D morphable model comprises:
   selecting a sample of the 3D morphable model in response to determining that the inner product is greater than the threshold; or
   rejecting the sample in response to determining that the inner product is not greater than the threshold.

9. The method of claim 8, wherein producing the 3D object reconstruction is based on selected samples of the 3D morphable model.

10. The method of claim 1, wherein the 3D object reconstruction is a 3D facial model.

11. An electronic device, comprising:
    a memory;
    a processor coupled to the memory, wherein the processor is configured to:
      receive first optical data and first depth data corresponding to a first frame;
      register the first depth data to a first canonical model;
      fit a three-dimensional (3D) morphable model to the first optical data;
      register the 3D morphable model to a second canonical model; and
      produce a 3D object reconstruction based on the registered first depth data and the registered 3D morphable model, wherein producing the 3D object reconstruction comprises extracting an isosurface from the first canonical model and the second canonical model.

12. The electronic device of claim 11, wherein the processor is configured to register the first depth data by performing at least one of a rigid registration and a non-rigid registration of the first depth data.

13. The electronic device of claim 11, wherein the processor is configured to register the 3D morphable model by performing at least one of a rigid registration and a non-rigid registration of the 3D morphable model.

14. The electronic device of claim 11, wherein the processor is configured to:
    receive second depth data corresponding to a second frame that is previous to the first frame; and
    map the second depth data to a canonical coordinate system to update the first canonical model.

15. The electronic device of claim 11, wherein the processor is configured to:
    receive second optical data corresponding to a second frame that is previous to the first frame;
    fit a second 3D morphable model to the second optical data; and
    map the second 3D morphable model to a canonical coordinate system to produce the second canonical model.

16. The electronic device of claim 11, wherein the processor is configured to:
    determine first normals of respective samples of the first depth data;

determine second normals of respective samples of the 3D morphable model; and determine whether to select each of the samples of the 3D morphable model based on a corresponding first normal and a corresponding second normal.

17. The electronic device of claim 16, wherein the processor is configured to determine whether to select each of the samples of the 3D morphable model by:

determining an inner product of the corresponding first normal and the corresponding second normal; and comparing the inner product to a threshold.

18. The electronic device of claim 17, wherein the processor is configured to determine whether to select each of the samples of the 3D morphable model by:

selecting a sample of the 3D morphable model in response to determining that the inner product is greater than the threshold; or rejecting the sample in response to determining that the inner product is not greater than the threshold.

19. The electronic device of claim 18, wherein the processor is configured to produce the 3D object reconstruction based on selected samples of the 3D morphable model.

20. The electronic device of claim 11, wherein the 3D object reconstruction is a 3D facial model.

21. A non-transitory tangible computer-readable medium storing computer executable code, comprising:

code for causing an electronic device to receive first optical data and first depth data corresponding to a first frame;

code for causing the electronic device to register the first depth data to a first canonical model;

code for causing the electronic device to fit a three-dimensional (3D) morphable model to the first optical data;

code for causing the electronic device to register the 3D morphable model to a second canonical model; and code for causing the electronic device to produce a 3D object reconstruction based on the registered first depth data and the registered 3D morphable model, comprising code for causing the electronic device to extract an isosurface from the first canonical model and the second canonical model.

22. The computer-readable medium of claim 21, wherein the code for causing the electronic device to register the first depth data comprises code for causing the electronic device to perform at least one of a rigid registration and a non-rigid registration of the first depth data.

23. The computer-readable medium of claim 21, wherein the code for causing the electronic device to register the 3D morphable model comprises code for causing the electronic device to perform at least one of a rigid registration and a non-rigid registration of the 3D morphable model.

24. The computer-readable medium of claim 21, further comprising:

code for causing the electronic device to receive second depth data corresponding to a second frame that is previous to the first frame; and code for causing the electronic device to map the second depth data to a canonical coordinate system to update the first canonical model.

25. The computer-readable medium of claim 21, further comprising:

code for causing the electronic device to receive second optical data corresponding to a second frame that is previous to the first frame;

code for causing the electronic device to fit a second 3D morphable model to the second optical data; and code for causing the electronic device to map the second 3D morphable model to a canonical coordinate system to produce the second canonical model.

26. An apparatus, comprising:

means for receiving first optical data and first depth data corresponding to a first frame;

means for registering the first depth data to a first canonical model;

means for fitting a three-dimensional (3D) morphable model to the first optical data;

means for registering the 3D morphable model to a second canonical model; and means for producing a 3D object reconstruction based on the registered first depth data and the registered 3D morphable model, wherein the means for producing the 3D object reconstruction comprises means for extracting an isosurface from the first canonical model and the second canonical model.

27. The apparatus of claim 26, wherein the means for registering the first depth data comprises means for performing at least one of a rigid registration and a non-rigid registration of the first depth data.

28. The apparatus of claim 26, wherein the means for registering the 3D morphable model comprises means for performing at least one of a rigid registration and a non-rigid registration of the 3D morphable model.

29. The apparatus of claim 26, further comprising:

means for receiving second depth data corresponding to a second frame that is previous to the first frame; and means for mapping the second depth data to a canonical coordinate system to update the first canonical model.

30. The apparatus of claim 26, further comprising:

means for receiving second optical data corresponding to a second frame that is previous to the first frame;

means for fitting a second 3D morphable model to the second optical data; and means for mapping the second 3D morphable model to a canonical coordinate system to produce the second canonical model.

* * * * *